(12) United States Patent
Koptiw et al.

(10) Patent No.: US 9,203,768 B2
(45) Date of Patent: *Dec. 1, 2015

(54) SYSTEM AND METHOD FOR PROVIDING DIFFERENTIATED QUALITY OF SERVICE

(71) Applicant: AT&T Intellectual Property II, L.P., Atlanta, GA (US)

(72) Inventors: Michael Koptiw, Mount Laurel, NJ (US); Steven M. Michelson, Exton, PA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/500,533

(22) Filed: Sep. 29, 2014

(65) Prior Publication Data

US 2015/0016465 A1 Jan. 15, 2015

Related U.S. Application Data

(63) Continuation of application No. 11/260,830, filed on Oct. 27, 2005, now Pat. No. 8,848,530.

(60) Provisional application No. 60/623,898, filed on Nov. 1, 2004.

(51) Int. Cl.
| | |
|---|---|
| *H04L 1/00* | (2006.01) |
| *H04L 12/825* | (2013.01) |
| *H04L 12/28* | (2006.01) |
| *H04L 12/801* | (2013.01) |
| *H04L 12/853* | (2013.01) |
| *H04L 12/851* | (2013.01) |

(Continued)

(52) U.S. Cl.
CPC ............ *H04L 47/25* (2013.01); *H04L 12/2854* (2013.01); *H04L 47/10* (2013.01); *H04L 47/2416* (2013.01); *H04L 47/2425* (2013.01); *H04L 47/2441* (2013.01); *H04L 47/283* (2013.01); *H04L 47/32* (2013.01); *H04L 49/206* (2013.01); *H04L 49/30* (2013.01)

(58) Field of Classification Search
USPC .................................. 370/230–235, 516–519
See application file for complete search history.

(56) References Cited

U.S. PATENT DOCUMENTS

| | | | |
|---|---|---|---|
| 5,414,650 | A | 5/1995 | Hekhuis |
| 6,021,263 | A | 2/2000 | Kujoory et al. |

(Continued)

FOREIGN PATENT DOCUMENTS

| | | |
|---|---|---|
| EP | 1227624 | 7/2002 |
| EP | 1414187 | 4/2004 |

(Continued)

OTHER PUBLICATIONS

Examiner's Report for CA Application No. 2,524,961, Jan. 3, 2008, consists of 3 pages.

(Continued)

*Primary Examiner* — Phuc Tran

(57) ABSTRACT

Described is a system and method for providing differentiated service levels. The method comprising receiving a packet stream including a plurality of packets. A level of service to be provided to the packet stream is determined. An impairment to the packet stream is determined as a function of the level of service. The impaired packet stream is outputted.

20 Claims, 2 Drawing Sheets

(51) Int. Cl.
*H04L 12/823* (2013.01)
*H04L 12/841* (2013.01)
*H04L 12/931* (2013.01)
*H04L 12/935* (2013.01)

(56) References Cited

U.S. PATENT DOCUMENTS

| | | |
|---|---|---|
| 6,714,517 B1 | 3/2004 | Fawaz et al. |
| 6,724,727 B2 | 4/2004 | Counterman |
| 6,765,873 B1 | 7/2004 | Fichou et al. |
| 6,798,743 B1 | 9/2004 | Ma et al. |
| 7,274,700 B2 | 9/2007 | Jin et al. |
| 8,848,530 B2 * | 9/2014 | Koptiw et al. ............ 370/235 |
| 2002/0107908 A1 | 8/2002 | Dharanikota |
| 2002/0143948 A1 | 10/2002 | Maher et al. |

FOREIGN PATENT DOCUMENTS

| | | |
|---|---|---|
| WO | WO 0230061 | 4/2002 |
| WO | WO 02052869 | 7/2002 |

OTHER PUBLICATIONS

Examination Report from CA 2,524,961, dated Jul. 29, 2009, p. 1-3.

* cited by examiner

SYSTEM AND METHOD FOR PROVIDING DIFFERENTIATED QUALITY OF SERVICE

PRIORITY CLAIM/INCORPORATION BY REFERENCE

This application is a continuation of U.S. patent application Ser. No. 11/260,830, filed Oct. 27, 2005, now U.S. Pat. No. 8,848,530, which claims the benefit of U.S. Provisional Patent Appln. 60/623,898, filed Nov. 1, 2004, all of which are herein incorporated by reference in their entirety.

BACKGROUND

An Internet Service Provider (ISP) may offer various services and levels of service over its IP network. For example, customers may contract with the ISP to receive a service at a preselected level of service. A service-level agreement (SLA) provides that the customer will get the contracted level of service. Thus, ISPs require mechanisms to differentiate the levels of service provided to a plurality of customers which request varying levels of the same service.

SUMMARY OF THE INVENTION

A method for providing differentiated service levels comprising receiving a packet stream including a plurality of packets. A level of service to be provided to the packet stream is determined. An impairment to the packet stream is determined as a function of the level of service. The impaired packet stream is outputted.

A device comprising a packet classifier for receiving a packet stream including a plurality of data packets and classifying the packet stream based on a level of service to be provided to the packet stream. A buffer introduces an impairment to the packet stream as a function of the level of service to be provided to the packet stream.

A system comprising a memory storing a set of instructions, a processor to execute the instructions, wherein the instructions are operable to receive a packet stream including a plurality of packets. The instructions operable to determine a level of service to be provided to the packet stream and introduce an impairment to the packet stream as a function of the level of service. The instructions operable to output the impaired packet stream.

DETAILED DESCRIPTION

Figure 1:
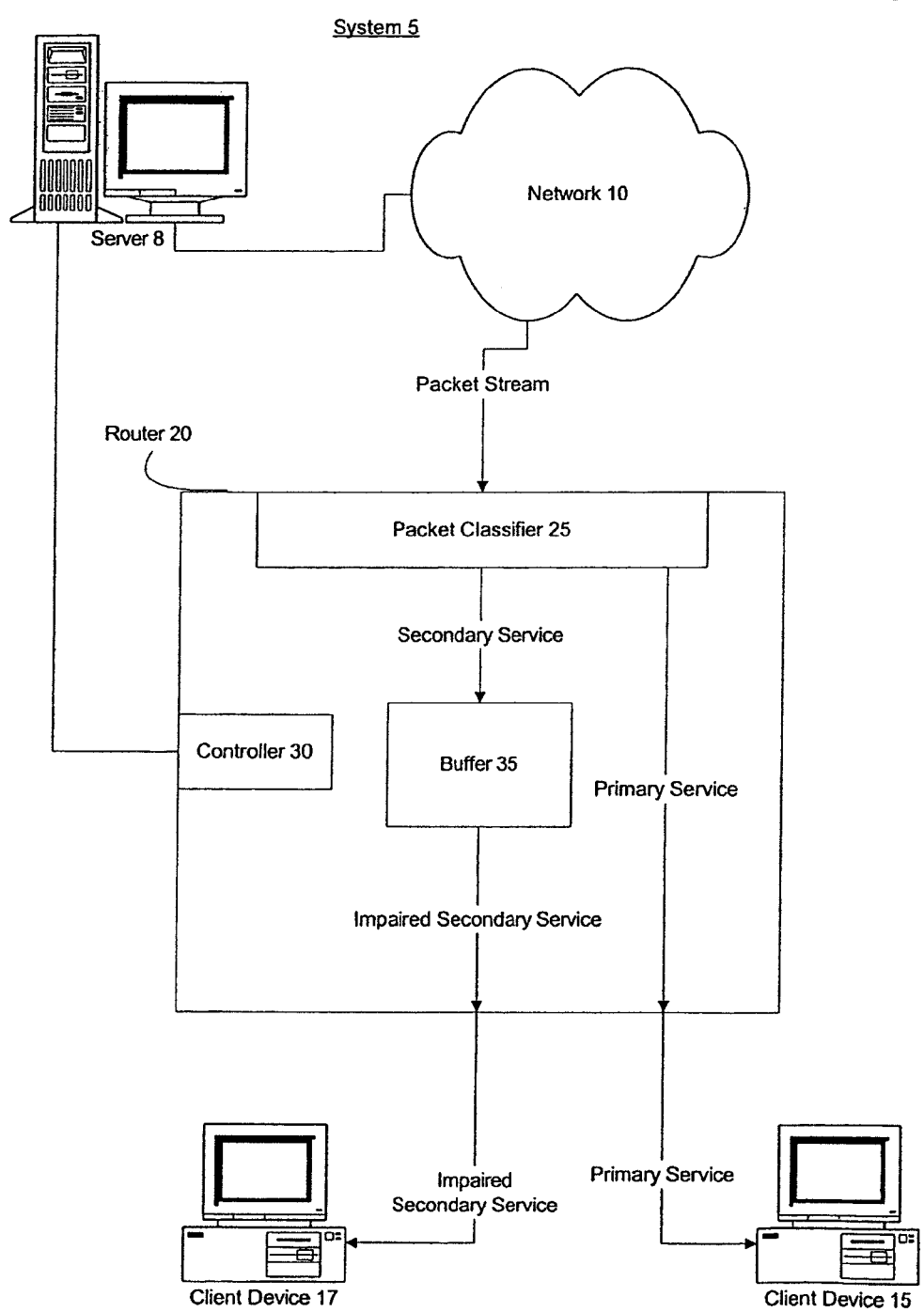
FIG. 1 shows an exemplary embodiment of a system according to the present invention.

The present invention may be further understood with reference to the following description and the appended drawings, wherein like elements are referred to with the same reference numerals. The exemplary embodiment of the present invention describes a system and a method for providing differentiated quality of service in a communications network. The system classifies packet streams in the network and performs a predetermined action on the streams to vary a quality of service provided to a transmitter/recipient of the stream.

FIG. 1 shows an exemplary embodiment of a system 5 for providing differentiated quality of service according to the present invention. The system 5 includes a communications network 10 (e.g., a broadband network) which is accessible by one or more client devices 15, 17 via a networking device (e.g., a router 20). Those of skill in the art will understand that elements of the system 5 may be varied while remaining within a general concept of the present invention. For example, the network 10 may include one or more servers (e.g., server 8), databases, hubs, routers, networks, etc. and any combination thereof. That is, the network 10 may include one or more wired/wireless local/wide area networks and/or the Internet. Furthermore, each of the client devices 15, 17 may be any computing device such as, for example, a phone, a PC, a laptop, a handheld computer, etc. Those of skill in the art will understand that the networking device may be implemented in software (e.g., a firewall) and/or hardware (e.g., any device with access to the broadband network).

According to the present invention, the client devices 15,17 may contract with a network service provider (NSP) for one or more services delivered over a predetermined portion of bandwidth on the network 10. The contract (e.g., a Service Level Agreement (SLA)) may include predefined limits and/or ranges on one or more quality of service metrics reflecting network performance that the client devices 15,17 are afforded by the NSP. For example, the client devices 15, 17 may pay a premium for limits on latency and packet loss, and increased throughput, data rates, security measures, etc. Generally, the quality of service improves as the premium increases, because the NSP allocates more resources to activity on the corresponding bandwidth. That is, data transfer with the client device 15 may be monitored more closely for suspicious activity than data transfer with the client device 17, because the client device 15 has paid a higher premium.

In one exemplary embodiment, the NSP may provide different levels of service to its customers. For example, the client devices 15, 17 may contract for the same service (e.g., VoIP service, video, teleconferencing, streaming music, etc.), but the client device 15 contracts for a higher level of the service. The higher level may translate into, for example, less delay, faster data rates, increased throughput, limited jitter on video, cap on packets dropped, etc.

In an alternative embodiment, the client device 15 contracts for a predefined service from the NSP and the client device 17 contracts for the same service provided by an alternative service provider (ASP). For example, the NSP and the ASP may offer a telecommunications service (e.g., VoIP service). However, as is conventionally known, the ASP utilizes the NSP's network to deliver its services. That is, the ASP may purchase bandwidth from the NSP to provide the service to its customers, but the actual means of providing the service (e.g., the broadband network), is owned by the NSP. Thus, the NSP controls the transport of data over the network.

Those of skill in the art will understand that this reference to the NSP control of the network may be any portion of the network. In a typical arrangement, the NSP will control the "last mile" of the network, i.e., the portion of the network that delivers the signals to the customer's location. For example, the NSP may be a cable company that owns and/or controls the cable that runs into customer's homes. Thus, an ASP, even if they have their own proprietary network for providing customer services may still be required to contract with the NSP to deliver the signal the last mile to the customer, e.g., sending VoIP packets over the cable to the customer's PC. However, this is only an example and the NSP control is not limited to only the last mile.

As shown in FIG. 1, the router 20 receives a packet stream from the network 10. The packet stream includes a multitude of packets carrying various payloads (e.g., data, voice, video, etc.) bound for devices coupled to the router 20, e.g., the client devices 15, 17. As described above, although transmission of the packet stream over the network 10 is controlled by the NSP, the service embodied by the packets may be provided by the NSP and/or the ASP. The exemplary embodiment will be described with respect to the NSP providing a pre-selected service (e.g., a VoIP service) at a primary service level and a secondary service level. The secondary service level will be considered to be inferior in quality to the primary service level. Thus, the client device 15 contracts for the VoIP service at the primary service level, and the client device 17 contracts for the VoIP service at the secondary service level.

When received by the router 20, the packet stream is input into a packet classifier 25. The packet classifier 25 may be a filter, differentiator, etc., embodied in software and/or hardware which determines whether the packet stream should receive the primary or the secondary service level. For example, the packet stream may have one or more characteristics which the packet classifier 25 utilizes to identify the service level the packet stream should receive. The characteristics may include, but are not limited to, a port number, one or more IP addresses (e.g., source, destination) and a payload of the packets in the packet stream. In the above-described example, the packet classifier 25 may determine that the packet stream includes the IP address of the client device 17 which has contracted for the secondary service level of the VoIP service, and packets that contain a Real-Time Transport Protocol (RTP) structured payload (e.g., real-time audio/video). The packet classifier 25 determines that the packet stream should be modified to reflect the secondary service level. That is, the packet stream may be received from the network 10 without having experienced any impairment (e.g., delay, jitter, packet loss, etc.) except for an ambient impairment which affects all network traffic. The packet stream exhibiting only, or at most, the ambient impairment may reflect the primary service level. Thus, an additional impairment may have to be introduced on the packet stream to have it reflect the secondary service level.

When the packet stream receives the primary service level, it may be fed directly into a controller 30 which calculates one or more service metrics reflecting impairment of the packet stream. For example, the service metrics may include delay, jitter and packet loss, and may be summarized to detail a quality of service provided to a customer. As described above, the client device 15 may have been provided with an SLA detailing limits and/or providing ranges for the service metrics, e.g., delay, jitter and packet loss. After the service metrics are calculated, the packet stream is outputted to, for example, the client device 15. Those of skill in the art will understand that there are many different metrics that may be used depending on the service and/or network and any of one or more of these metrics may be defined in the SLAs of customers.

When the packet classifier 25 determines that the packet stream should receive the secondary service level, the router 20 may execute a predetermined operation on the packet stream altering, for example, the transmission path/time between the network 10 and the client device 17. In an exemplary embodiment, the packet stream is passed through one or more buffer 35 for introducing one or more impairments on the packet stream. For example, the buffer 35 may introduce latency on the packet stream by holding one or more a packets for a predetermined time (e.g., 10 ms). A second buffer may introduce a predetermined percentage of jitter on the packet stream, and a third buffer may drop one or more packets from the packet stream introducing a packet loss factor. Those of skill in the art will understand that the third buffer may not be a conventional buffer, but simply not forward the one or more packets so that their receipt is not acknowledged. Those of skill in the art will understand that any number of buffers may be utilized to introduce any type of impairment on the packet stream. For example, the buffer 35 may introduce one or more of the above-described impairments. According to exemplary embodiments of the present invention, action of the buffer(s) results in a corresponding difference in service metrics for the secondary service level which are measured by the controller 30.

Various configurations and operations of the buffer 35 may be utilized to differentiate the secondary service level from the primary service level. For example, the actions of the buffer 35 may be randomized. That is, the buffer 35 may introduce a delay within a predefined range (e.g., approximately 7-15 ms). Optionally, the delay may be probabilistic in that the packet(s) selected for delay and/or a delay duration may be chosen at random, but, on average, an overall delay for the packet stream or a portion thereof for the second service level may be a variable, but predetermined value (e.g., approximately 10%). The buffer 35 may also randomize the introduction of jitter and packet loss. In another exemplary embodiment, a timer and a buffer controller are included in combination with the buffer 35. The timer records a time each packet enters and leaves the buffer 35, with the time being determined by the buffer controller. The operation of the buffer 35 may be embodied in a set of rules utilized by the router 20 and/or the buffer controller when the packet classifier 25 determines whether the packet stream should receive the primary or the secondary service level.

Those of skill in the art will understand that the buffer 35 may operate in an opposite manner. For example, the buffer 35 may be used to introduce a security measure (e.g., a firewall) on the packet stream to enhance the quality of service. In this exemplary embodiment, when the packets classifier 25 determines that the packet stream should receive the primary service level, the packet stream is passed through the buffer 35 to enhance the quality of service.

After the packet stream is output from the buffer 35, a controller 30 computes the corresponding service metrics which reflect the secondary service level. Due to action of the buffer 35 on the packet stream, the service metrics for the secondary service level may indicate that the quality of service is inferior to the primary service level. For example, when the service is a VoIP service, the client device 17, receiving the secondary service level, may experience echo, dropped calls, low quality audio, etc. As described above, the client device 17 may have contracted for the inferior quality of service (e.g., the secondary service level) by paying a lower premium than the client device 15.

Those of skill in the art will understand that the system 5 may include a network management device, e.g., a server 8, which coordinates activity of a plurality of routers. The server 8 may harvest data (e.g., the service metrics) from the routers in the system 5 to coordinate differentiation of the service levels. For example, a router (e.g., a core router) in the system 5 may have introduced delay into a packet stream which is afforded the secondary service level. When the router 20 (e.g., an edge router) receives the same packet stream, the server 8 may provide an instruction to deactivate the buffer 35 so that the packet stream leaves the router 20 unaffected. This may ensure that the packet stream is not so affected by delay, jitter, packet loss, etc., that the service metrics become greater than a predetermined threshold (e.g., as specified in the SLA). Those of skill in the art will understand that in another exemplary embodiment, the router 20 operates independently of other routers in the system 5 so that the incoming packet stream is acted on by the buffer 35 regardless of any impairment previously introduced thereto.

In addition, the exemplary embodiments show that the classification (packet classifier 25), the impairment (buffer 35) and the metric measurement (controller 30) are all included as functions provided by hardware and/or software components in the router 20. Those of skill in the art will understand that this embodiment is only exemplary and that one or more of these functions may be performed by other hardware and/or software components that are included as part of the network other than the router 20.

Figure 2:
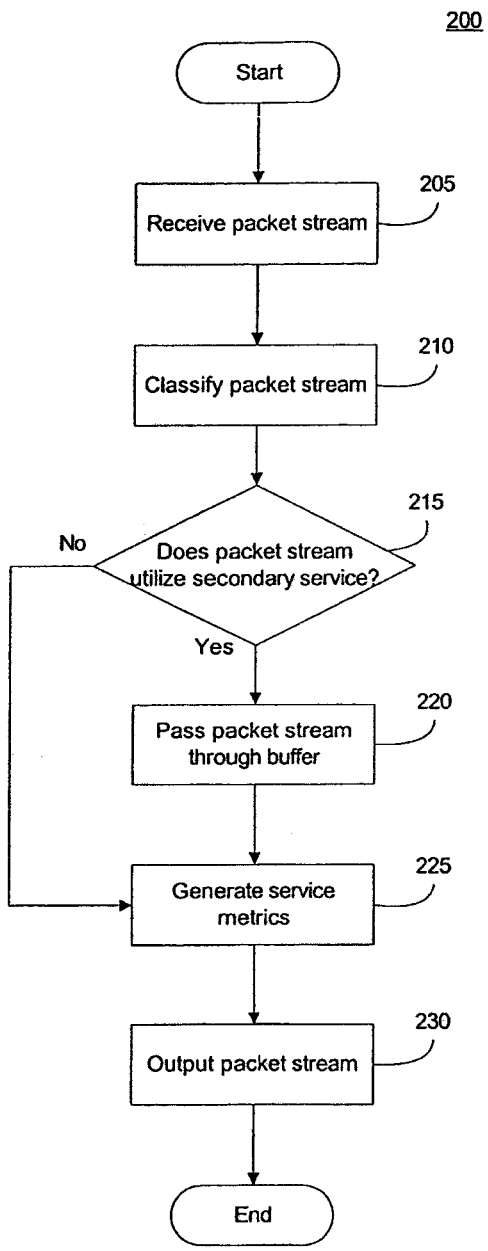
FIG. 2 shows an exemplary embodiment of a method according to the present invention.

An exemplary embodiment of a method 200 for providing differentiated service levels according to the present invention is shown in FIG. 2. As noted above, the method 200 may be implemented in software, hardware or any combination thereof. In an exemplary embodiment, the router 20, a core router, a firewall or any device with access to data streams from a broadband network (e.g., network 10) implements the method 200. However, as described above, execution of the method 200 (or a portion thereof) may be controlled by the server 8 or any other network management device.

In step 205, a packet stream is received by the router 20. In the exemplary embodiment, the packet stream arrives at the router 20 unaffected (e.g., unimpaired) by any other routers except for any ambient impairment typically experienced in data transfer over the network. That is, customers may expect delay, jitter and/or packet loss within a preselected range which does not have a significant effect on the quality of service. Thus, the packet stream received by the router 20 may have experienced some ambient impairment, but has not been acted upon by another device or application implementing the present invention.

In step 210, the packet stream is classified to determine whether it should receive the primary service level or the secondary service level. As described above, the classification may be generated based on one or more attributes of the packet stream, such as, port number, IP addresses and/or payload. In step 215, the process determines whether the packet stream should receive the secondary service level based on the classification by the packet classifier 25. Optionally, it may be determined whether the packet stream was acted on by any device prior to receipt by the router 20. For example, if the packet stream already exhibits delay above a predefined threshold, the router 20 may simply treat the packet stream as if it were part of the primary service level. Alternatively, the router 20 may receive a message from the server (or other network device) indicating that impairment has been previously introduced into the packet stream and that the router 20 should not introduce any further impairment. In a further exemplary embodiment, when a packet stream is impaired, one or more data packets may include embedded information indicating that the packets have been impaired. For example, the impairing device may add information in the header of a particular packet which indicates a range of packets that have been impaired. This information may be stripped from the packets before the packets reach the customer to prevent the customer from analyzing the packets and determining that there has been a deliberate impairment to the packets. If the packet stream receives the primary service level, or receives the secondary service but has already been impaired beyond an ambient level, the process proceeds to step 225, which will be described below.

In step 220, the packet stream has been classified to receive the secondary service level, and, as a result, is passed through the buffer 35. The configuration and action of the buffer 35 is described above. In an exemplary embodiment, the server 8 may control and coordinate impairment of the packet stream by the buffer 35 and other devices/applications implementing the method of the present invention. Preferably, the impairment of the packet stream (e.g., the delay, jitter and/or packet loss) utilizes a randomness factor, such that one type of impairment is not prevalent (e.g., noticeable) over the others. The randomness factor may be utilized to satisfy the terms/limits in the SLA, because simply introducing delay may cause an overall delay on the packet stream to breach a term/limit/range of delay specified in the SLA. Thus, the NSP may introduce delay, jitter and packet loss at random and up to the limits specified in the SLA.

In step 225, the service metric(s) are generated based on impairment to the packet stream. When the packet stream receives the primary service level, the service metrics may only reflect the ambient impairment experienced by transfer on the network 10. However, when the packet stream receives the secondary service level, the service metrics reflect the ambient impairment and the impairment introduced by the buffer 35. In step 230, the packet stream is outputted to a device, such as the client device 15 or 17. Those of skill in the art will understand that when the method 200 is implemented by a core router, the packet stream may be transmitted to a further router or other networking device (e.g., switch, hub, server, etc.).

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
   receiving, by a router, a packet stream including a plurality of packets;
   determining, by the router, a level of service to be provided to the packet stream, wherein the determining the level of service to be provided to the packet stream comprises determining an address to which the packet stream is addressed, wherein the address is a destination internet protocol address;
   selecting, by the router, an impairment from a plurality of impairments to introduce to the packet stream as a function of the level of service, wherein each of the plurality of impairments is an additional impairment over an ambient impairment experienced by the packet stream, wherein the plurality of impairments includes a delay, a jitter and a packet loss;
   introducing, by the router, the impairment that is selected to the packet stream; and
   outputting, from the router, the packet stream to which the impairment that is selected has been introduced.

2. The method of claim 1, further comprising:
   generating a service metric for the packet stream.

3. The method of claim 2, wherein the service metric indicates the level of service applied to the packet stream.

4. The method of claim 1, wherein the plurality of packets includes voice over internet protocol packets.

5. The method of claim 1, wherein the level of service is defined in a service level agreement with a customer receiving the packet stream.

6. The method of claim 1, wherein the determining of the level of service further comprises:
   determining a port number for the packet stream.

7. The method of claim 1, wherein the determining of the level of service further comprises:
   determining a payload of the packet stream.

8. A device, comprising:
a packet classifier for receiving a packet stream including a plurality of data packets and classifying the packet stream based on a level of service to be provided to the packet stream, wherein the packet classifier classifies the level of service by determining an address to which the packet stream is addressed, wherein the address is a destination internet protocol address; and
a buffer for introducing a different impairment of a plurality of impairments to the packet stream as a function of the level of service to be provided to the packet stream, wherein each of the plurality of impairments is an additional impairment over an ambient impairment experienced by the packet stream, wherein the plurality of impairments includes a delay, a jitter and a packet loss.

9. The device of claim 8, wherein the device comprises a router.

10. The device of claim 9, wherein the service metric indicates the level of service applied to the packet stream.

11. The device of claim 8, further comprising:
a controller generating a service metric for the packet stream.

12. The device of claim 8, wherein the plurality of packets includes voice over internet protocol packets.

13. The device of claim 8, wherein the level of service is defined in a service level agreement with a customer receiving the packet stream.

14. The device of claim 8, wherein the device outputs the packet stream to which the different impairment of the plurality of impairments has been introduced to a user device.

15. The device of claim 8, wherein the packet classifier determines whether the packet stream has been previously impaired by another device.

16. A router comprising:
a processor; and
a memory storing instructions which, when executed by the processor, cause the processor to perform operations, the operations comprising:
receiving a packet stream including a plurality of packets;
determining a level of service to be provided to the packet stream, wherein the determining the level of service to be provided to the packet stream comprises determining an address to which the packet stream is addressed, wherein the address is a destination Internet protocol address;
selecting an impairment from a plurality of impairments to introduce to the packet stream as a function of the level of service, wherein each of the plurality of impairments is an additional impairment over an ambient impairment experienced by the packet stream, wherein the plurality of impairments includes a delay, a jitter and a packet loss;
introducing the impairment that is selected to the packet stream; and
outputting the packet stream to which the impairment that is selected has been introduced.

17. The router of claim 16, wherein the operations further comprise:
generating a service metric for the packet stream.

18. The router of claim 17, wherein the service metric indicates the level of service applied to the packet stream.

19. The router of claim 16, wherein the determining of the level of service further comprises:
determining a port number for the packet stream.

20. The router of claim 16, wherein the determining of the level of service further comprises:
determining a payload of the packet stream.

* * * * *